US009653781B2

(12) United States Patent
Chou et al.

(10) Patent No.: US 9,653,781 B2
(45) Date of Patent: May 16, 2017

(54) ELECTRONIC DEVICE (71) Applicant: JIENG TAI INTERNATIONAL ELECTRIC CORP., New Taipei (TW)

(72) Inventors: Yu-Pang Chou, New Taipei (TW); Pei-Zong Rao, New Taipei (TW); Jyh-Hui Chang, New Taipei (TW)

(73) Assignee: JIENG TAI INTERNATIONAL ELECTRIC CORP., New Taipei (TW)

( * ) Notice: Subject to any disclaimer, the term of this patent is extended or adjusted under 35 U.S.C. 154(b) by 0 days.

(21) Appl. No.: 14/623,487

(22) Filed: Feb. 16, 2015

(65) Prior Publication Data

US 2015/0244062 A1 Aug. 27, 2015

Related U.S. Application Data

(60) Provisional application No. 61/942,629, filed on Feb. 21, 2014.

(30) Foreign Application Priority Data

Jun. 12, 2014 (TW) .............................. 103120326 A (51) Int. Cl.
*H04M 1/00* (2006.01)
*H01Q 1/24* (2006.01)
*H04B 5/00* (2006.01)
*H01Q 21/28* (2006.01)

(52) U.S. Cl.
CPC ............ *H01Q 1/243* (2013.01); *H01Q 21/28* (2013.01); *H04B 5/0025* (2013.01); *H04B 5/0031* (2013.01)

(58) Field of Classification Search
None
See application file for complete search history.

(56) References Cited

U.S. PATENT DOCUMENTS

| 6,862,433 | B2* | 3/2005 | Callaway, Jr. | ......... | H01Q 1/241 |
| | | | | | 343/702 |
| 8,059,056 | B2* | 11/2011 | Ma | ......................... | H01Q 1/243 |
| | | | | | 343/833 |
| 8,159,399 | B2* | 4/2012 | Dorsey | ................ | H01Q 1/2266 |
| | | | | | 343/702 |
| 8,228,231 | B2* | 7/2012 | Ono | ....................... | H01Q 21/28 |
| | | | | | 342/359 |
| 8,868,144 | B2* | 10/2014 | Shi | ....................... | H01Q 21/245 |
| | | | | | 455/277.1 |
| 9,065,535 | B2* | 6/2015 | Wong | ...................... | H04B 1/40 |

(Continued)

*Primary Examiner* — Tuan A Tran
(74) *Attorney, Agent, or Firm* — CKC & Partners Co., Ltd.

(57) ABSTRACT

An electronic device is provided. The electronic device includes a casing, a display module, and a communication module. The casing includes a first surface and a second surface. The display module is disposed on the first surface and has a display region. The communication module includes a first antenna module and a second antenna module. The first antenna module is disposed close to the display module and is corresponding perpendicularly to at least one part of the display region. The second antenna module is disposed close to the second surface. The communication module selectively receives and transmits a wireless signal along an outward direction extending from the first surface via the first antenna module or along an outward direction extending from the second surface via the second antenna module.

10 Claims, 12 Drawing Sheets

(56) References Cited

U.S. PATENT DOCUMENTS

| | | | |
|---|---|---|---|
| 9,356,335 B2* | 5/2016 | Li | H01Q 1/44 |
| 2013/0169507 A1* | 7/2013 | Ko | H01Q 1/243 343/876 |
| 2014/0179242 A1* | 6/2014 | Liao | H04W 4/008 455/90.1 |

* cited by examiner

ELECTRONIC DEVICE

RELATED APPLICATIONS

This application claims priority to U.S. Provisional Application Ser. No. 61/942,629, filed Feb. 21, 2014, and to Taiwan Application Serial Number 103120326, filed Jun. 12, 2014, which is herein incorporated by reference.

BACKGROUND

Field of Invention

The present invention relates to an electronic device. More particularly, the present invention relates to an electronic device capable of performing a near field communication (NFC).

Description of Related Art

Near field communication is a short-range high-frequency wireless communication technology in which interconnection and intercommunication between electronic devices within a short distance can be realized by using magnetic induction principle. Because the near field communication provides great convenience to the transmission, management, and storage of information and tends to transact within a short distance, it is quite suitable for the exchange of important information, such as financial information or personal information. Many of today's consumer electronics, such as mobile phones, personal digital assistants (PDAs), tablet personal computers, notebook computers, etc., have been equipped with near field communication chips to perform personal identification, information exchange, or transaction payments.

However, when a near field communication antenna is integrated into an electronic device, high-frequency signals thus generated are possibly affected by the metal casing or other metal devices of the electronic device. As a result, the signals receivable and transmittable by the near field communication antenna are weakened, or the signals can not even be received or transmitted. In order to avoid the effects caused by these devices, considerable restrictions are imposed on the location of the near field communication antenna disposed in the electronic device and the area of the near field communication antenna. In addition, due to the limitation of area, the size of the near field communication antenna becomes smaller and smaller. The difference in antenna size will lead to weak coupling of magnetic fields, thus inhibiting the ability of the near field communication antenna to transmit energy.

For the forgoing reasons, there is a need for solving the above-mentioned problems by providing an electronic device.

SUMMARY

In order to solve the above-mentioned problems, the present disclosure discloses an electronic device that is able to improve the ability of the near field communication antenna to receive and transmit a signal with a limited layout area.

An electronic device is provided. The electronic device includes a casing, a display module, and a communication module. The casing has a first surface and a second surface. The display module is disposed on the first surface and has a display region. The communication module includes a first antenna module and a second antenna module. The first antenna module is disposed close to the display module and is corresponding perpendicularly to at least one part of the display region. The second antenna module is disposed close to the second surface. The communication module selectively receives and transmits a wireless signal along an outward direction extending from the first surface via the first antenna module or along an outward direction extending from the second surface via the second antenna module.

In the foregoing, the electronic device further includes a sensing module disposed on the casing and configured for generating at least one sensing signal. The communication module further includes a control unit configured for selecting at least one of the first antenna module and the second antenna module to receive and transmit the wireless signal according to the at least one sensing signal.

In the foregoing, the sensing module includes a sensing unit disposed on the first surface or the second surface.

In the foregoing, the sensing module includes several sensing units respectively disposed at different locations on the first surface or the second surface.

In the foregoing, each of the first antenna module and the second antenna module includes a near field communication antenna unit.

In the foregoing, the communication module includes a near field communication circuit. The communication module connects the near field communication circuit to the first antenna module and the second antenna module in series so as to simultaneously drive the first antenna module and the second antenna module.

In the foregoing, the communication module includes a near field communication circuit. The communication module connects the near field communication circuit to the first antenna module and the second antenna module in parallel so as to simultaneously drive the first antenna module and the second antenna module.

In the foregoing, the communication module includes a near field communication circuit. The communication module selectively connects the near field communication circuit to the first antenna module and the second antenna module in parallel via a first switch and a second switch, respectively. The communication module respectively drives the first antenna module of the communication module and the second antenna module of the communication module through controlling the first switch and the second switch.

In the foregoing, at least one of the first antenna module and the second antenna module includes several near field communication antenna units. The near field communication antenna units are divided into several antenna unit groups. The communication module selectively receives and transmits the wireless signal along the outward direction extending from the first surface or the outward direction extending from the second surface via the antenna unit groups.

In the foregoing, the electronic device further includes a mainboard disposed between the display module and the second surface of the casing. The first antenna module is disposed between the display module and the mainboard.

In the foregoing, the electronic device further includes a battery module disposed between the mainboard and the second surface of the casing. The second antenna module is disposed between the battery module and the second surface of the casing or on the second surface of the casing.

In the foregoing, the first surface includes a non-display region not overlapping the display region. Part of the first antenna module extends to be corresponding perpendicularly to the non-display region.

In the foregoing, the second surface is opposite to the first surface and is on a back cover of the casing.

In the foregoing, the second surface is approximately perpendicular to the first surface and on one side of the casing.

In the foregoing, the second antenna module is disposed close to a headphone hole, a speaker, or a volume button of the electronic device.

In summary, the second antenna module is disposed on any surface (except for the first surface) of the casing of the electronic device and receives and transmits a wireless signal along the direction different from the direction along which the first antenna module receives and transmits a wireless signal. Thus, the electronic device can selectively receive and transmit a wireless signal along different directions via the first antenna module or the second antenna module. As a result, even though the ability of the first antenna module to receive and transmit a wireless signal is weakened along a specific direction or due to an obstacle, the electronic device still can receive and transmit a wireless signal via the second antenna module to allow the electronic device to accurately exchange information with another device and read/write information. In addition, disposing the second antenna module on other surface of the casing renders the overall area to be utilized effectively and will not affect the ability of the second antenna module to receive and transmit a wireless signal. Additionally, it is not necessary to dispose two near field communication circuits in the electronic device to respectively activate the first near field communication antenna and the second near filed communication antenna. Therefore, the cost for disposing the extra near field communication chip can be saved and so is the area required for circuit layout.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of present specification. The drawings illustrate embodiments of the disclosure and, together with the description, serve to explain the principles of the disclosure. In the drawings.

DESCRIPTION OF THE EMBODIMENTS

Reference will now be made in detail to the present embodiments of the disclosure, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, fell-known structures and devices are schematically depicted in order to simplify the drawings.

Figure 1A:
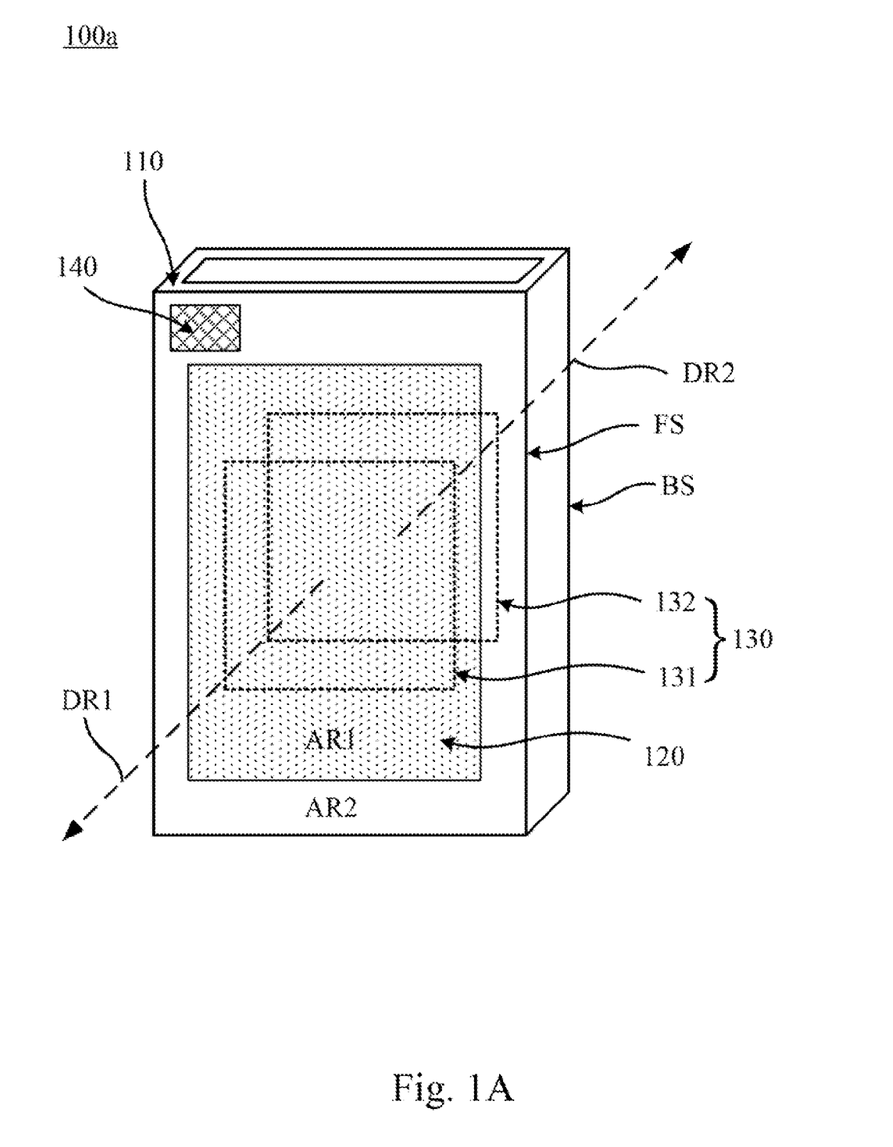
FIG. 1A depicts a schematic diagram of an electronic device according to a first embodiment of present disclosure.
Figure 1B:
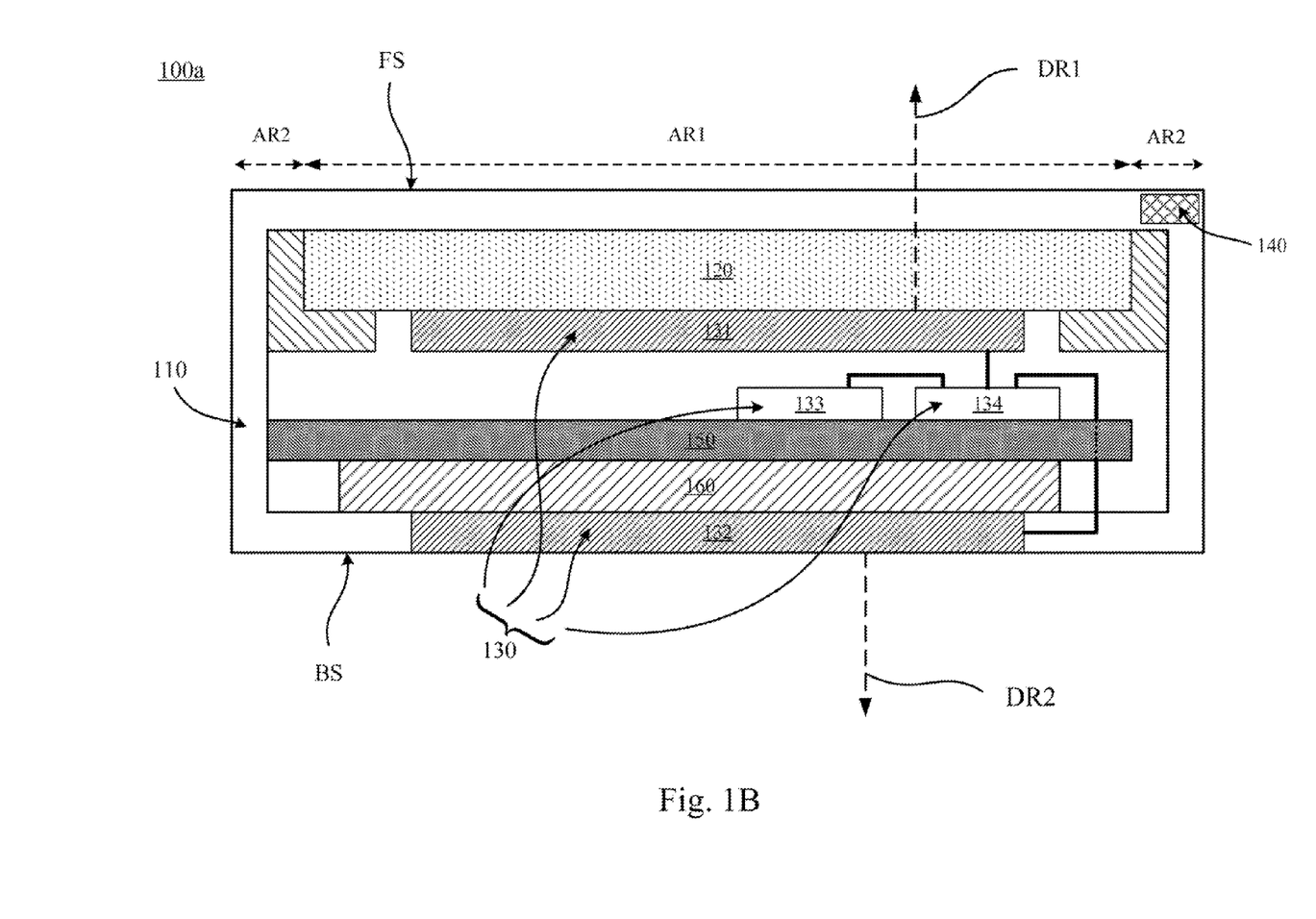
FIG. 1B depicts a cross-sectional view of the electronic device in FIG. 1A according to the first embodiment of present disclosure.

FIG. 1A depicts a schematic diagram of an electronic device 100a according to a first embodiment of present disclosure. FIG. 1B depicts a cross-sectional view of the electronic device 100a in FIG. 1A according to the first embodiment of present disclosure. The electronic device 100a may be a portable electronic device comprising a mobile phone, a PDA, a tablet personal computer, or a notebook computer. The electronic device 100a includes a casing 110, a display module 120, and a communication module 130. The casing 110 includes a first surface FS and a second surface BS. The display module 120 is disposed on the first surface FS. The first surface FS is divided into a display region AR1 and a non-display region AR2. The non-display region AR2 does not overlap the display region AR1. In addition, a range of the display region AR1 corresponds to an area of the display module 120. The communication module 130 includes a first antenna module 131 and a second antenna module 132. The first antenna module 131 is disposed close to the display module 120 and is corresponding perpendicularly to at least one part of the display region AR1. The second antenna module 132 is disposed close to the second surface BS. The communication module 130 may selectively receive and transmit a wireless signal along an outward direction DR1 extending from the first surface FS via the first antenna module 131 or along an outward direction DR2 extending from the second surface BS via the second antenna module 132.

In greater detail, when the electronic device 100a approaches a wireless signal transceiver device (not shown in the figures) or another electronic device 100a, the electronic device 100a can selectively exchange information with the wireless signal transceiver device (not shown in the figures) or the another electronic device 100a or read/write information of the electronic device 100a and the wireless signal transceiver device (not shown in the figures) or the another electronic device 100a along the outward direction DR1 extending from the first surface FS via the first antenna module 131 or along the outward direction DR2 extending from the second surface BS via the second antenna module 132. The wireless signal transceiver device (not shown in the figures) may comprise a near field communication transceiver device, a radio frequency identification (RFID) transceiver device, a blue tooth transceiver device, an infrared transceiver device, or a ZigBee transceiver device.

In one embodiment, the electronic device 100a further includes a sensing module 140. The sensing module 140 includes a sensing unit. The sensing module 140 may be disposed on the first surface FS, the second surface BS, or at least one of the other four surfaces of the casing 110. In the present embodiment, the sensing module 140 is disposed in the non-display region AR2 on the first surface FS, but the present disclosure is not limited in this regard. The sensing module 140 is configured for generating a sensing signal. Additionally, the communication module 130 further includes a control unit 133 coupled to the first antenna module 131, the second antenna module 132, and the sensing module 140. The control unit 133 is configured for selecting at least one of the first antenna module 131 and the second antenna module to receive and transmit a wireless signal according to the sensing signal.

In one embodiment, the sensing unit may comprise a light sensor, a magnetic sensor, a pressure sensor, or a temperature sensor. The control unit 133 can turn on at least one of the first antenna module 131 and the second antenna module 132 correspondingly according to the sensing signal generated by various types of sensors and the location of the sensor. For example, when the sensing unit is a light sensor and disposed on the first surface FB, as shown in FIG. 1B the control unit 133 can determine whether an obstacle is currently positioned in front of the light sensor according to whether the light sensor receives a light signal (that is, the sensing signal). If the light sensor can not receive the light signal, the control unit 133 determines that there is an obstacle (such as a hand) on the first surface FS and turns on the second antenna module 132 and/or turns off the first antenna module 131. If the light sensor can receive the light signal, the control unit 133 turns on the first antenna module 131 and/or turns off the second antenna module 132.

Figure 1C:
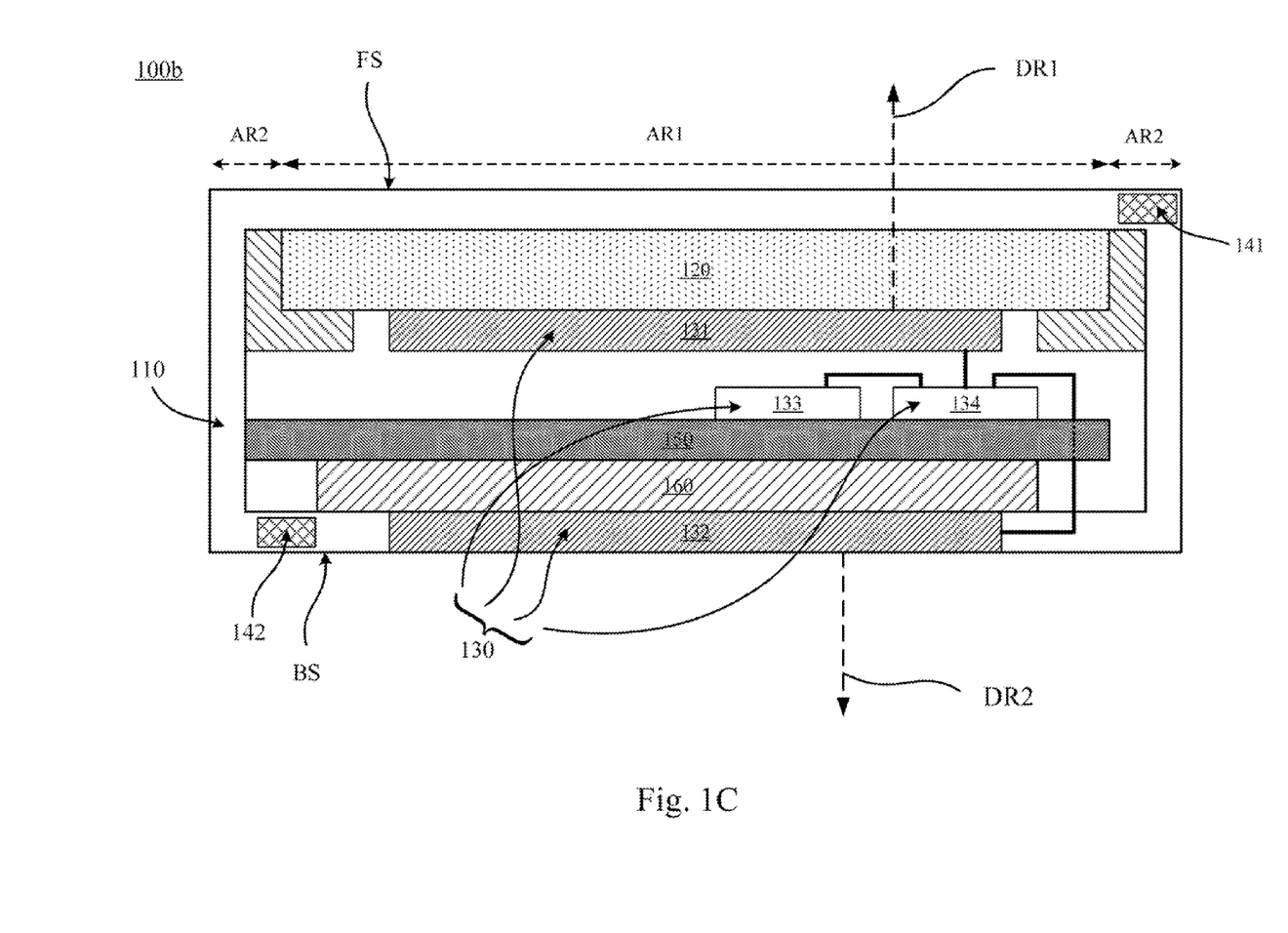
FIG. 1C depicts a cross-sectional view of an electronic device according to a second embodiment of present disclosure.

In another embodiment, the sensing module 140 may comprise a plurality of different or same sensing units disposed on different surfaces of the casing 110. FIG. 1C depicts a cross-sectional view of an electronic device 100b according to a second embodiment of present disclosure. According to the present embodiment, the sensing module 140 includes a first sensing unit 141 and a second sensing unit 142 respectively disposed on the first surface FS and the second surface BS. For example, the first sensing unit 141 may comprise a magnetic sensor and the second sensing unit 142 may comprise a temperature sensor. The control unit 133 may determine to turn on at least one of the first antenna module 131 and the second antenna module 132 according to whether the magnetic sensor detects a magnetic flux signal and whether a temperature detected by the temperature sensor is higher than a threshold value.

The above-mentioned numbers and implementation methods of the sensing unit(s) are only illustrative. In other words, those of ordinary skill in the art may configure different sensors and judgment conditions as necessitated by environments and requirements without departing from the spirit and scope of the present disclosure so as to realize the control method of the first antenna module 131 and the second antenna module 132.

In one embodiment, the first antenna module 131 includes a first near field communication antenna unit, and the second antenna module 132 includes a second near field communication antenna unit. In addition, the communication module 130 further comprises a near field communication circuit 134. In some embodiments, the near field communication circuit 134 includes a demodulator, a signal generator, or a communication chip for generating or receiving a wireless communication signal.

The near field communication circuit 134 can transmit a wireless communication signal to external or receive a wireless communication signal from external via the first antenna module 131 and the second antenna module 132. The control unit 133 is configured for determining the interaction relationships between the near field communication circuit 134, the first antenna module 131, and the second antenna module 132.

Figure 2A:
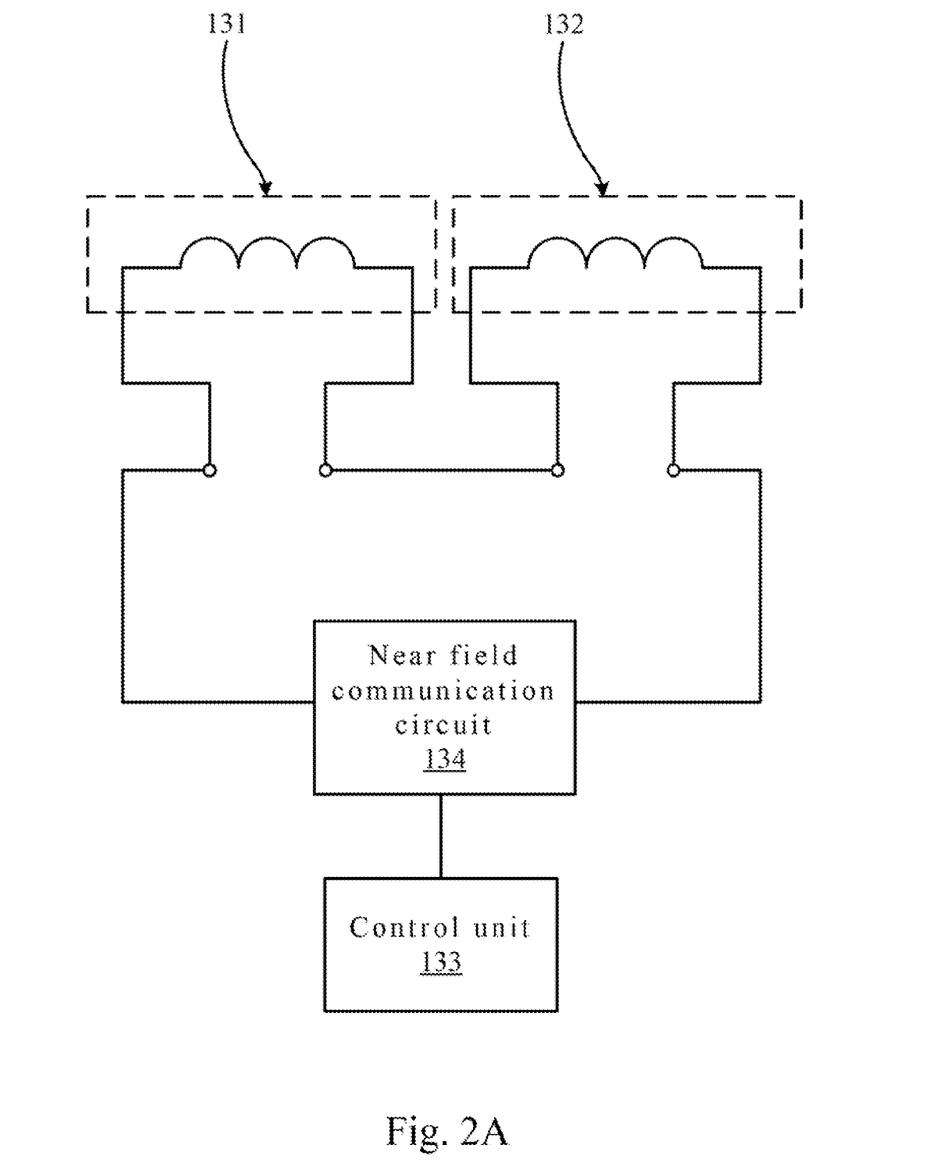
FIG. 2A depicts a schematic diagram of connection relationships between a near field communication circuit, a first antenna module, and a second antenna module according to one embodiment of present disclosure.

FIG. 2A depicts a schematic diagram of connection relationships between the near field communication circuit 134, the first antenna module 131, and the second antenna module 132 according to one embodiment of present disclosure. The control unit 133 may connect the near field communication circuit 134 to the first antenna module 131 and the second antenna module 132 in series so as to simultaneously drive the first antenna module 131 and the second antenna module 132, as shown in FIG. 2A.

Figure 2B:
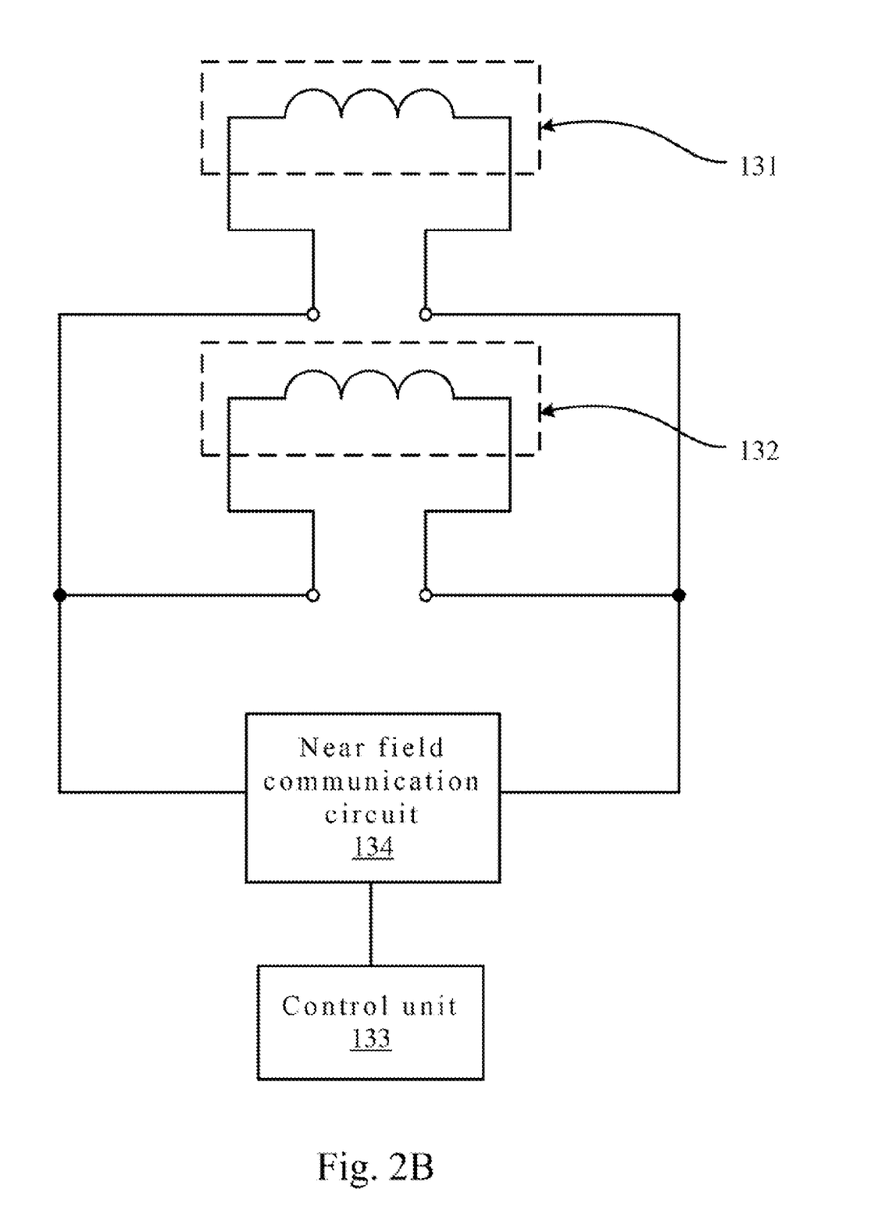
FIG. 2B depicts a schematic diagram of connection relationships between a near field communication circuit, a first antenna module, and a second antenna module according to another embodiment of present disclosure.

Additionally, a description is provided with reference to FIG. 2B. FIG. 2B depicts a schematic diagram of connection relationships between the near field communication circuit 134, the first antenna module 131, and the second antenna module 132 according to another embodiment of present disclosure. As shown in FIG. 2B, the control unit 133 may connect the near field communication circuit 134, the first antenna module 131, and the second antenna module 132 in parallel so as to simultaneously drive the first antenna module 131 and the second antenna module 132.

In other words, when the electronic device 100a includes a near field communication circuit 134, the control unit 133 may connect the near field communication circuit 134, the first antenna module 131, and the second antenna module 132 in series or in parallel. With such a configuration, the electronic device 100a can simultaneously operate the first antenna module 131 and the second antenna module 132 via the single near field communication circuit 134. That is, it is not necessary to dispose two near field communication circuits in the electronic device 100a so as to respectively activate the first antenna module 131 and the second antenna module 132. Therefore, the cost for disposing the extra near field communication chip can be saved and so is the area required for circuit layout. In addition, the ability of the electronic device 100a to receive and transmit a wireless signal is improved by simultaneously activating the first antenna module 131 and the second antenna module 132.

Figure 2C:
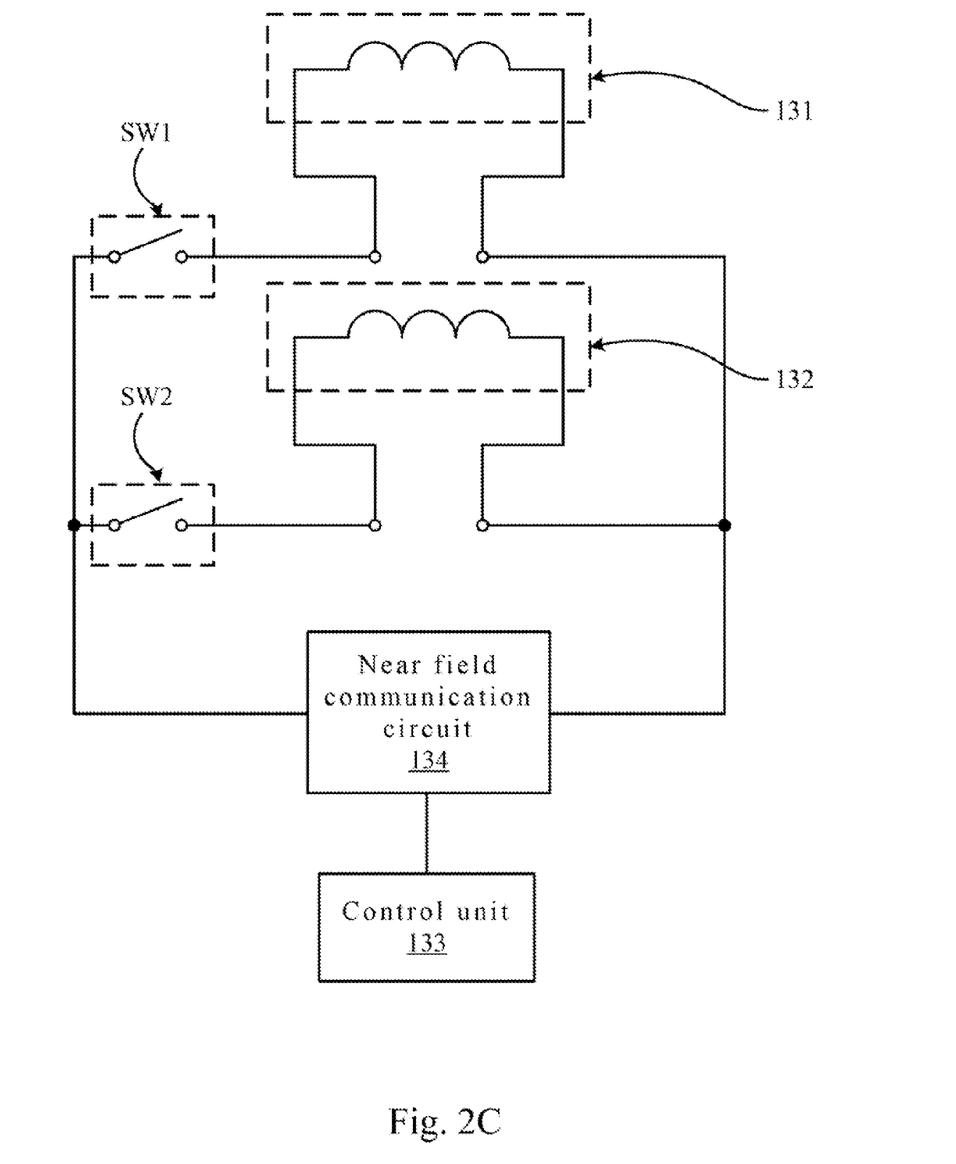
FIG. 2C depicts a schematic diagram of connection relationships between a near field communication circuit, a first antenna module, and a second antenna module according to a still another embodiment of present disclosure.

FIG. 2C depicts a schematic diagram of connection relationships between the near field communication circuit 134, the first antenna module 131, and the second antenna module 132 according to a still another embodiment of present disclosure. In the present embodiment, the communication module 130 may further comprise a first switch SW1 and a second switch SW2. The control unit 133 may selectively connect the near field communication circuit 134 to the first antenna module 131 and the second antenna module 132 in parallel via the first switch SW1 and the second switch SW2, respectively. The control unit 133 may respectively drive a first near field communication antenna unit 1311 and a second near field communication antenna unit 1321 through controlling the first switch SW1 and the second switch SW2.

In greater detail, the control unit 133 may only selectively turn on the first switch SW1 or the second switch SW2 or simultaneously turn on the first switch SW1 and the second switch SW2 according to the sensing signal so as to utilize the first antenna module 131 and the second antenna module 132 efficiently. For example, when an obstacle is in the outward direction DR1 extending from the first surface FS, the control unit 133 can selectively turn on the second switch SW2 to allow the electronic device 100*a* to receive and transmit a wireless signal via the second antenna module 132. The electric power required by the turn-on first antenna module 131 is thus saved. In addition, when obstacles are in both the outward direction DR1 extending from the first surface FS and the outward direction DR2 extending from the second surface BS, the control unit 133 can select to turn on the first switch. SW1 and the second switch SW2 simultaneously so that the electronic device 100*a* can receive and transmit a wireless signal via the first antenna module 131 and the second antenna module 132 simultaneously. Hence, the problem that the electronic device 100*a* can not read/write information or exchange information with another device due to a poor signal is avoided.

It is noted that the near field communication is taken as an example in the above embodiments. However, the present disclosure is not limited in this regard. In other words, those of ordinary skill in the art may apply the above implementation methods to other wireless communication technologies, such as wireless radio frequency identification communication, blue tooth communication, infrared communication, ZigBee communication, etc.

In one embodiment, the electronic device 100*a* further comprise a mainboard 150 and a battery module 160. The mainboard 150 is disposed between the display module 120 and the second surface BS of the casing 110. The battery module 160 is disposed between the mainboard 150 and the second surface BS. In another embodiment, the battery module 160 may be disposed immediately adjacent to the mainboard 150, but the present disclosure is not limited in this regard. The mainboard 150 serves as a support for electronic components in the electronic device 100*a* (such as the control unit 133, the near field communication circuit 134, the first switch SW1, the second switch SW2, etc.) and provides line connections between the electronic components. The battery module 160 is used for providing electric power required by the electronic device 100*a*.

Figure 3:
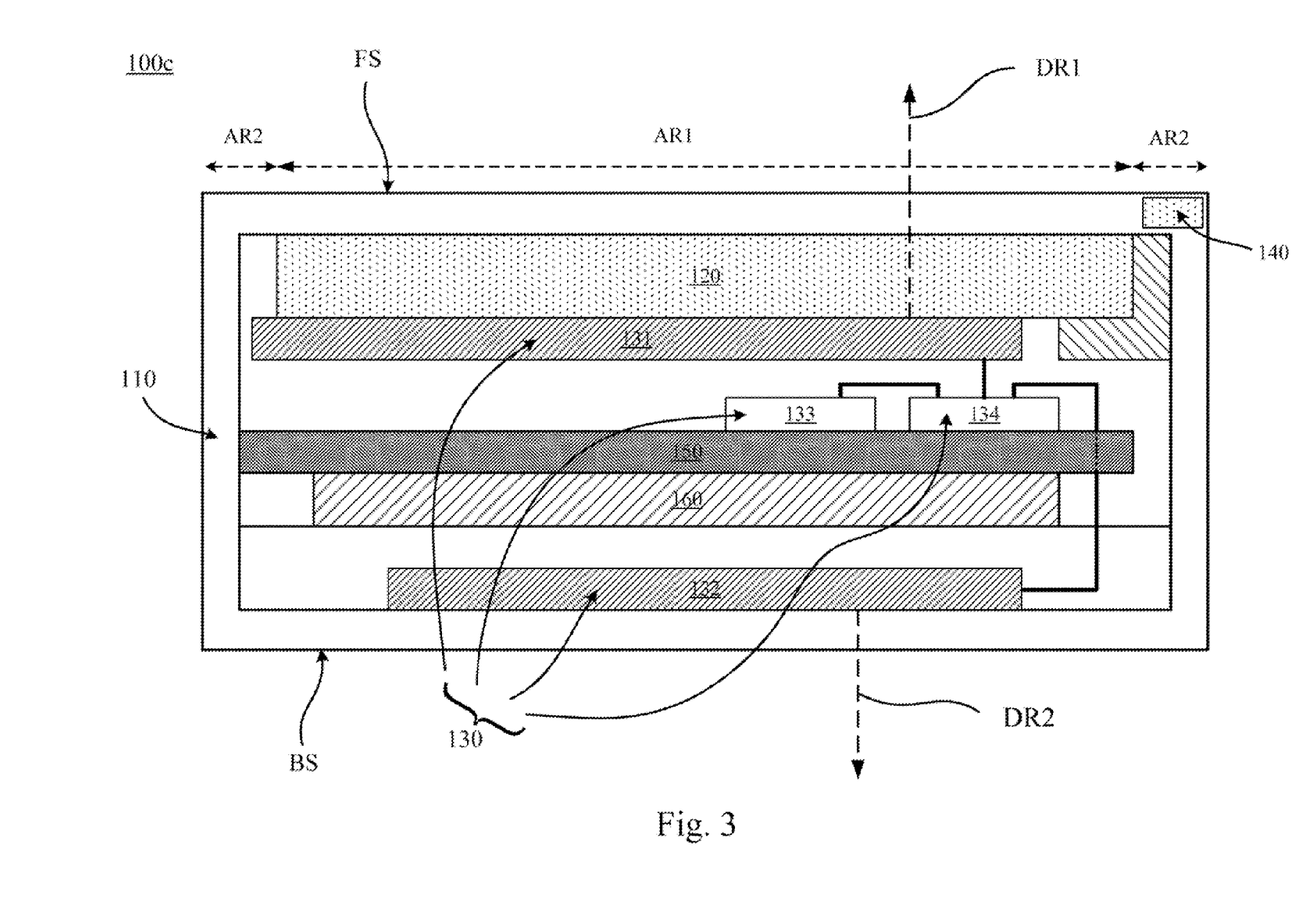
FIG. 3 depicts a cross-sectional view of an electronic device according to a third embodiment of present disclosure.

In one embodiment, the first antenna module 131 may be disposed between the display module 120 and the mainboard 150. In another embodiment, the first antenna module 131 may be disposed immediately adjacent to the display module 120, but the present disclosure is not limited in this regard. Additionally, the disposition location of the first antenna module 131 may be corresponding perpendicularly to the display region AR1, as shown in FIG. 1B. In still another embodiment, part of the first antenna module 131 may extend to be corresponding perpendicularly to the non-display region AR2, as shown in FIG. 3. FIG. 3 depicts a cross-sectional view of an electronic device 100*c* according to a third embodiment of present disclosure.

In addition, the second antenna module 132 may be disposed between the battery module 160 and the second surface BS of the casing 110, as shown in FIG. 1B. In another embodiment, the second antenna module 132 may be disposed on the second surface BS of the casing 110, as shown in FIG. 3. It is noted that the above-mentioned disposition methods of the first antenna module 131 and the second antenna module 132 are not intended to limit the present disclosure. In other words, those of ordinary skill in the art may apply the disposition method of the first antenna module 131 or the second antenna module 132 in one embodiment to another embodiment as necessitated by environments and requirements without departing from the spirit and scope of the present disclosure.

In the present embodiment, the second surface BS is opposite to the first surface FS, and the second surface BS is on a back cover of the casing 110. In other words, the first antenna module 131 is approximately parallel to the second antenna module 132, and the direction DR1 along which the first antenna module 131 receives and transmits a wireless signal is approximately 180 degrees from the direction DR2 along which the second antenna module 132 receives and transmits a wireless signal.

According to the embodiment shown in FIG. 16, the first antenna module 131 mainly receives and transmits a wireless signal along the direction DR1 (towards the top of the figure). In present embodiment, the mainboard 150 and the battery module 160 are disposed underneath the first antenna module 131. The mainboard 150 usually has many metal lines and active devices, and the battery module 160 usually includes metal materials. If the first antenna module 131 receives and transmits a wireless signal downwardly, the wireless signal will be affected by metallic shield phenomenon caused by the mainboard 150 and the battery module 160.

Similarly, the second antenna module 132 mainly receives and transmits a wireless signal along the direction DR2 (towards the bottom of the figure). In present embodiment, the mainboard 150 and the battery module 160 are disposed above the second antenna module 132. If the second antenna module 132 receives and transmits a wireless signal upwardly, the wireless signal will be affected by metallic shield phenomenon caused by the mainboard 150 and the battery module 160.

Therefore, the disclosure discloses that the first antenna module 131 and the second antenna module 132 are respectively disposed on a front side and a back side of the electronic device 100*a* (in present embodiment two sides of the mainboard 150 and the battery module 160). The first antenna module 131 and the second antenna module 132 are thus allowed to receive and transmit a wireless signal along different directions DR1 and DR2 so that the wireless signal will not be shielded by other internal devices in the electronic device 100*a*. In the above embodiments, the mainboard 150 and the battery module 160 are taken as an example for illustrating the internal devices of the electronic device 100, but the disclosure is not limited in this regard. In practice, the electronic device 100*a* may further comprise other internal device (not shown in the figures) possibly leading to metallic shield. Through the practices of the disclosure, it is ensured that at least one antenna module will not be impacted by the negative influence of metallic shield.

Figure 4A:
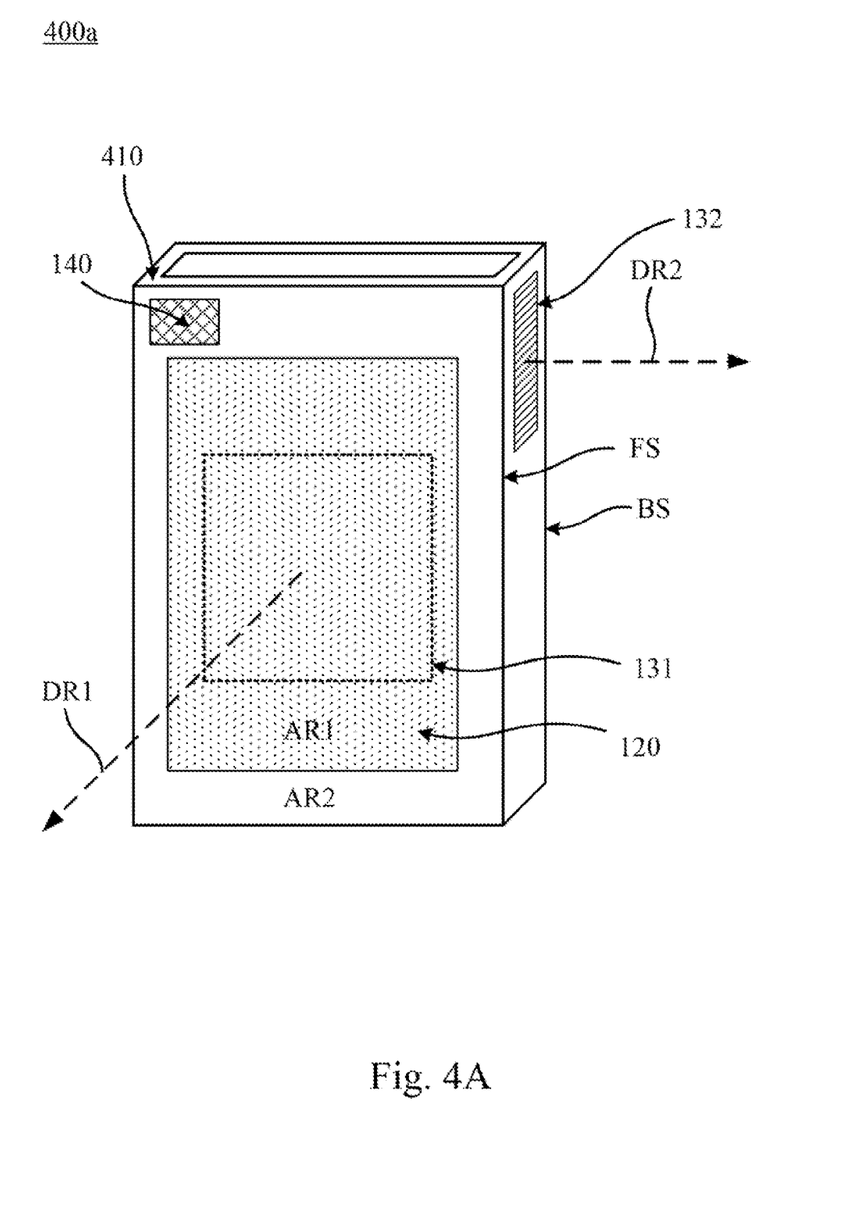
FIG. 4A depicts a schematic diagram of an electronic device according to a fourth embodiment of present disclosure.
Figure 4B:
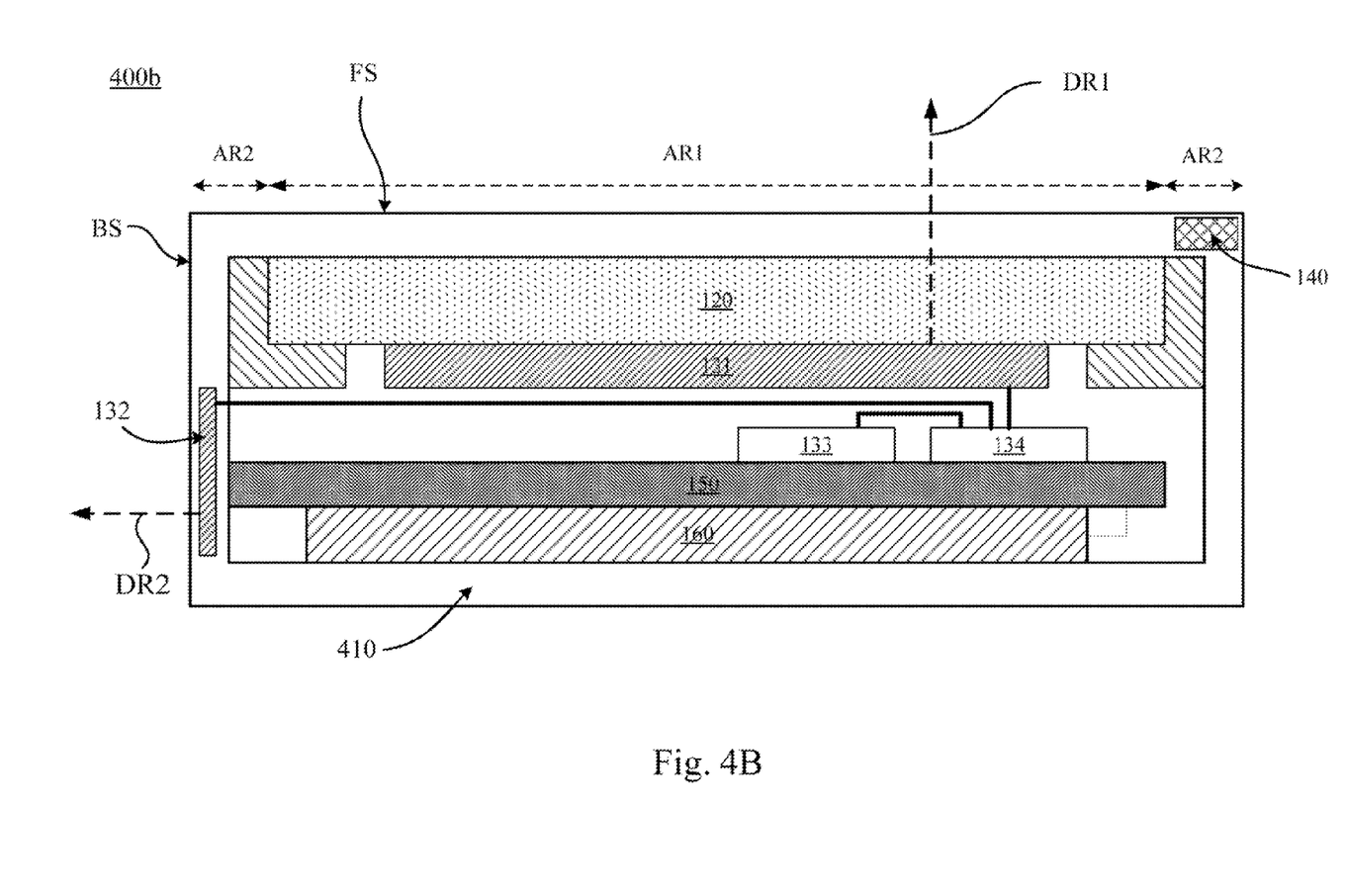
FIG. 4B depicts a cross-sectional view of an electronic device according to a fifth embodiment of present disclosure.
Figure 4C:
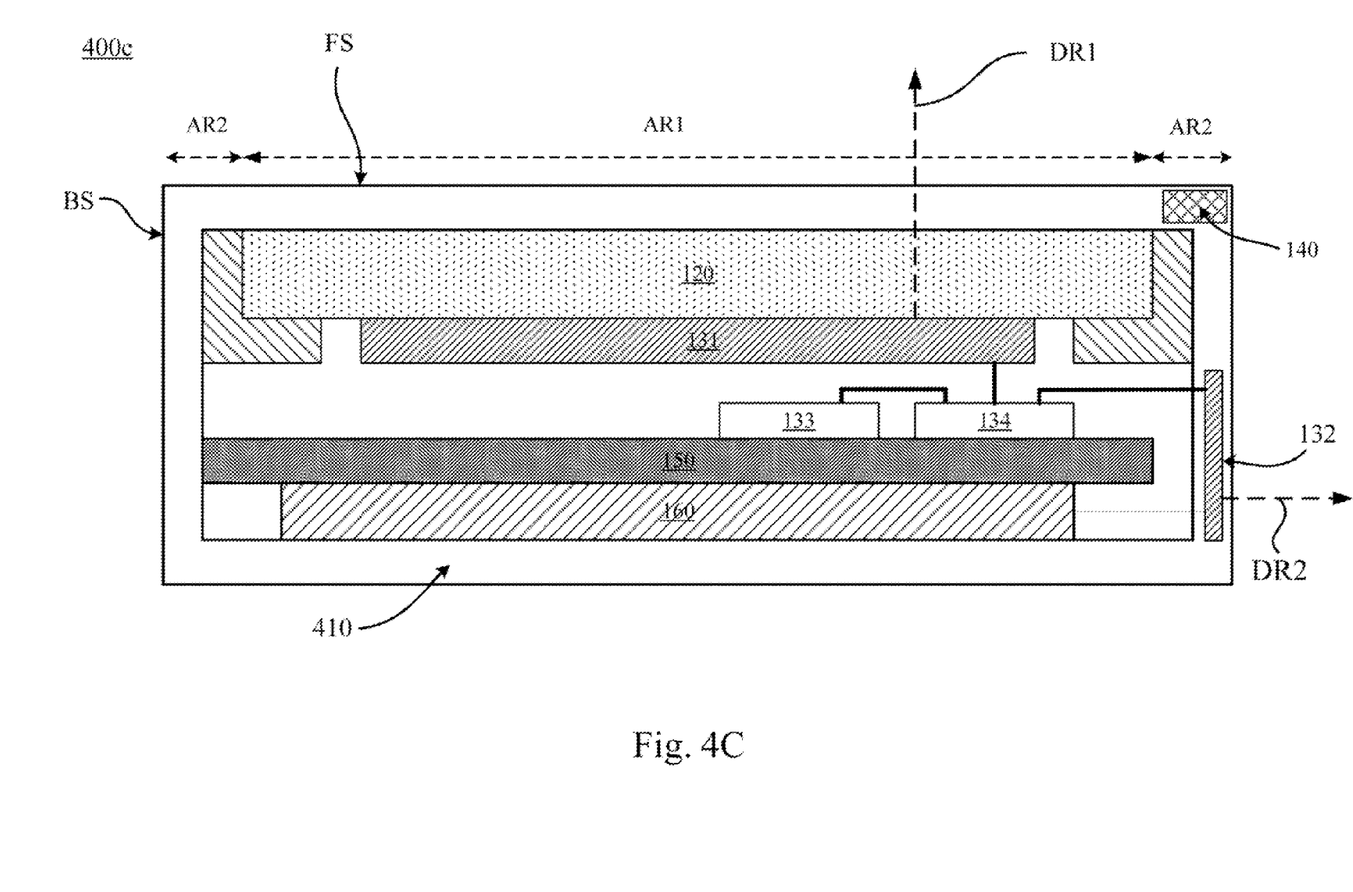
FIG. 4C depicts a cross-sectional view of an electronic device according to a sixth embodiment of present disclosure.

A description is provided with reference to FIG. 4A, FIG. 4B, and FIG. 4C. FIG. 4A depicts a schematic diagram of an electronic device 400*a* according to a fourth embodiment of present disclosure. FIG. 4B depicts a cross-sectional view of an electronic device 400*b* according to a fifth embodiment of present disclosure. FIG. 4C depicts a cross-sectional view of an electronic device 400*c* according to a sixth embodiment of present disclosure. As shown in FIG. 4A, FIG. 4B, and FIG. 4C, the second surface BS of a casing 410 is approximately perpendicular to the first surface FS, and the second surface BS is on one side of the casing 410. In other words, the first antenna module 131 is approximately perpendicular to the second antenna module 132, and the direction DR1 along which the first antenna module 131 receives and transmits a wireless signal is approximately 90 degrees from the direction DR2 along which the second antenna module 132 receives and transmits a wireless signal.

In one embodiment, when the second antenna module 132 is disposed on the second surface BS of the casing 410 which is approximately perpendicular to the first surface FS, the second antenna module 132 may be further disposed close to a headphone hole, a speaker, or a volume button (not shown in the figures) of the electronic devices 400a-400c, but the present disclosure is not limited in this regard.

In greater detail, in the above embodiments, the second antenna module may be disposed on any surface (except for the first surface) of the casing as required by practical design, and receives and transmits a wireless signal along the direction different from the direction along which the first antenna module receives and transmits a wireless signal. Hence, when the ability of the first antenna module to receive and transmit a wireless signal is weakened along a specific direction or due to an obstacle, the electronic device still can receive and transmit a wireless signal via the second antenna module to allow the electronic device to accurately exchange information with another device and read/write information. Additionally, disposing the second antenna module on other surface of the casing renders the overall area to be utilized effectively (that is, to utilize the layout area not used) and at the same time will not affect the ability of the second antenna module to receive and transmit a wireless signal.

Figure 5A:
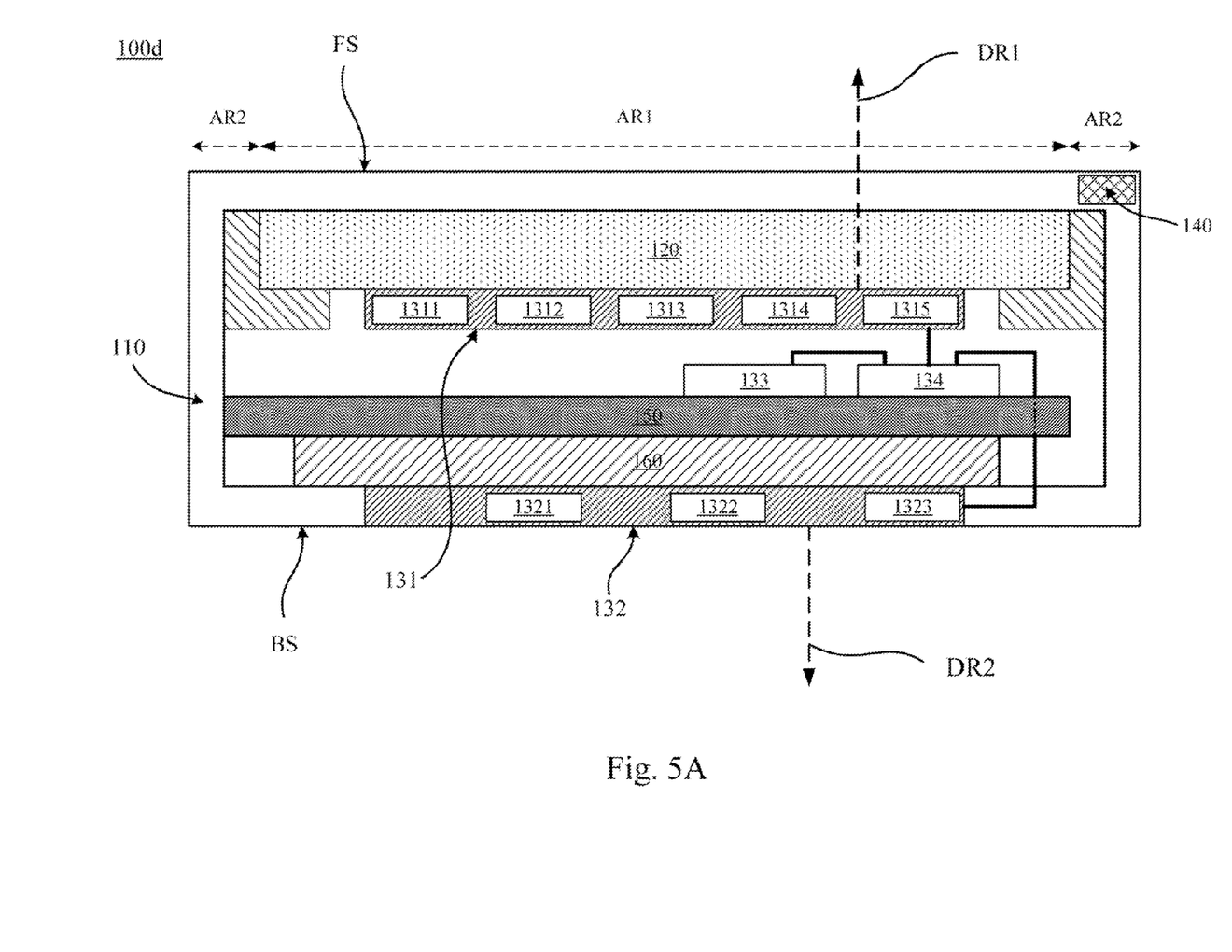
FIG. 5A depicts a cross-sectional view of an electronic device according to a seventh embodiment of present disclosure.

FIG. 5A depicts a cross-sectional view of an electronic device 100d according to a seventh embodiment of present disclosure. In one embodiment, the first antenna module 131 may comprise a plurality of first near field communication antenna units (as depicted in the figure there are five first near field communication antenna units 1311, 1312, 1313, 1314, 1315), and the second antenna module 132 may comprise a plurality of second near field communication antenna units (as depicted in the figure there are three second near field communication antenna units 1321, 1322, 1323). Since the connections and operations of the first antenna module 131 and the second antenna module 132 are similar to the connections and operations of the first antenna module 131 and the second antenna module 132 in FIG. 2A, FIG. 2B, ad FIG. 2C, a further description in this regard is not provided.

Figure 5B:
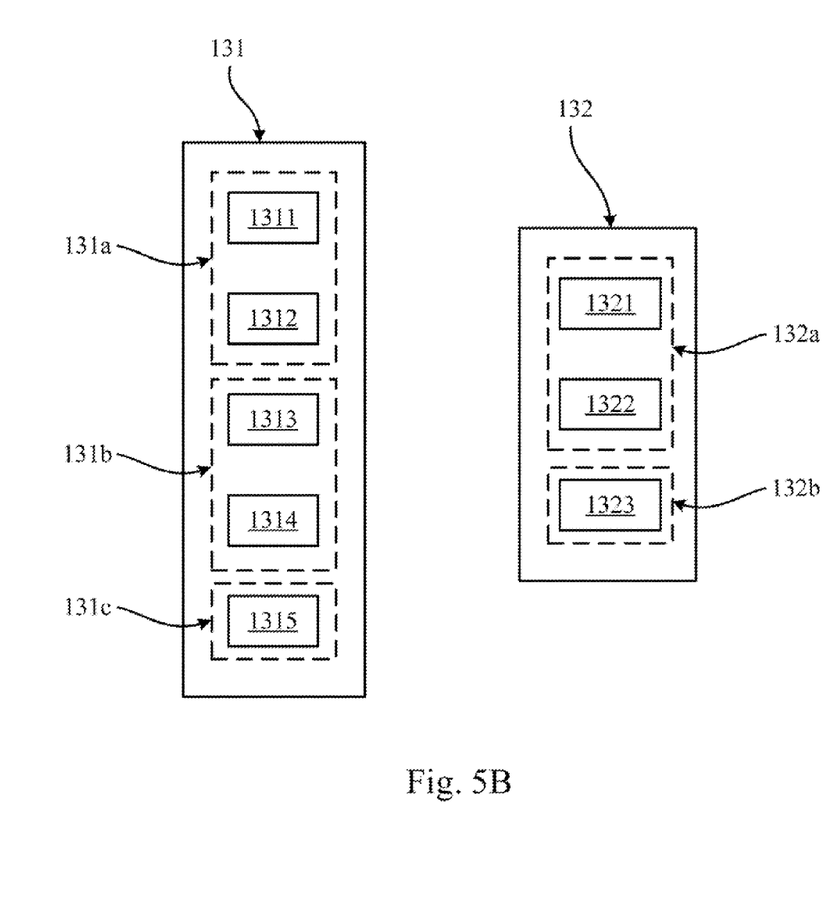
FIG. 5B depicts a schematic diagram of a first antenna module and a second antenna module according to one embodiment of present disclosure.

FIG. 5B depicts a schematic diagram of the first antenna module 131 and the second antenna module 132 according to one embodiment of present disclosure. In the present embodiment, the control unit (not shown in the figure) can further divide the first near field communication antenna units 1311-1315 into a plurality of first antenna unit groups (as depicted in the figure there are three first antenna unit groups 131a, 131b, and 131c) and the second near field communication antenna units 1321-1323 into a plurality of second antenna unit groups (as depicted in the figure there are two second antenna unit groups 132a and 132b). The group selection method described above is only illustrative and not intended to limit the present disclosure.

In greater detail, the control unit (not shown in the figure) may selectively receive and transmit a wireless signal along an outward direction extending from the first surface of the casing (not shown in the figure) via at least one of the first antenna unit groups 131a, 131b, and 131c, and receive and transmit a wireless signal along an outward direction extending from the second surface of the casing (not shown in the figure) via at least one of the second antenna unit groups 132a and 132b. Furthermore, the control unit (no shown in the figure) can select via which of the antenna unit groups a wireless signal is received and transmitted according to the sensing signal(s) detected by a plurality of sensing units (not shown in the figure) disposed on the first surface or the second surface so as to further improve the efficiency of use of the antenna units.

It is understood from embodiments of the present disclosure that the second antenna module is disposed on any surface (except for the first surface) of the casing of the electronic device and receives and transmits a wireless signal along the direction different from the direction along which the first antenna module receives and transmits a wireless signal. Thus, the electronic device can selectively receive and transmit a wireless signal along different directions via the first antenna module or the second antenna module. As a result, even though the ability of the first antenna module to receive and transmit a wireless signal is weakened along a specific direction or due to an obstacle, the electronic device still can receive and transmit a wireless signal via the second antenna module to allow the electronic device to accurately exchange information with another device and read/write information. In addition, disposing the second antenna module on other surface of the casing renders the overall area to be utilized effectively and will not affect the ability of the second antenna module to receive and transmit a wireless signal. Additionally, it is not necessary to dispose two near field communication circuits in the electronic device to respectively activate the first near field communication antenna and the second near filed communication antenna. Therefore, the cost for disposing the extra near field communication chip can be saved and so is the area required for circuit layout.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of present disclosure provided they fall within the scope of the following claims and their equivalents.

What is claimed is:

1. An electronic device comprising:
   a casing having a first surface and a second surface, wherein the second surface is opposite to the first surface;
   a display module disposed on the first surface and having display region and a non-display region not overlapping the display region;
   a mainboard disposed between the display module and the second surface of the casing; and
   a communication module for near field communication comprising:
   a first antenna module being in direct contact with the display module, and the first antenna module being disposed between the display module and the mainboard and being positioned directly under the display region of the display module and in the display region; and
   a second antenna module disposed between the mainboard and the second surface, wherein each of the first antenna module and the second antenna module comprises a near field communication antenna unit, wherein the communication module selectively receives and transmits a wireless signal along an outward direction extending from the first surface via the first antenna module or along an outward direction extending from the second surface via the second antenna module.

2. The electronic device of claim 1, further comprising a sensing module disposed on the casing and configured for generating at least one sensing signal, the communication module further comprising a control unit configured for selecting at least one of the first antenna module and the second antenna module to receive and transmit the wireless signal according to the at least one sensing signal.

3. The electronic device of claim 2, wherein the sensing module comprises a sensing unit disposed on the first surface or the second surface.

4. The electronic device of claim 2, wherein the sensing module comprises a plurality of sensing units respectively disposed at different locations on the first surface or the second surface.

5. The electronic device of claim 2, when the sensing module senses obstacles are in both the outward direction extending from the first surface and the outward direction extending from the second surface, the control unit selects the first antenna module and the second antenna module to receive and transmit the wireless signal simultaneously.

6. The electronic device of claim 1, wherein the communication module comprises a near field communication circuit, the communication module connects the near field communication circuit to the first antenna module and the second antenna module in series so as to simultaneously drive the first antenna module and the second antenna module.

7. The electronic device of claim 1, wherein the communication module comprises a near field communication circuit, the communication module connects the near field communication circuit to the first antenna module and the second antenna module in parallel so as to simultaneously drive the first antenna module and the second antenna module.

8. The electronic device of claim 1, wherein the communication module comprises a near field communication circuit, the communication module selectively connects the near field communication circuit to the first antenna module and the second antenna module in parallel via a first switch and a second switch, respectively, so as to respectively drive the first antenna module and the second antenna module through controlling the first switch and the second switch.

9. The electronic device of claim 1, wherein at least one of the first antenna module and the second antenna module comprises a plurality of near field communication antenna units, the near field communication antenna units are divided into a plurality of antenna unit groups, the communication module selectively receives and transmits the wireless signal along the outward direction extending from the first surface or the outward direction extending from the second surface via the antenna unit groups.

10. The electronic device of claim 1, further comprising a battery module disposed between the mainboard and the second surface of the casing, the second antenna module being disposed between the battery module and the second surface of the casing or on the second surface of the casing.

* * * * *